Patented Dec. 21, 1943

2,337,339

UNITED STATES PATENT OFFICE 2,337,339

BLENDED RUBBER COMPOSITION

Wilbert B. McCluer and Ralph W. Hufferd, Bradford, Pa., assignors to Kendall Refining Company, Bradford, Pa., a corporation of Pennsylvania No Drawing. Application August 3, 1940, Serial No. 351,183

4 Claims. (Cl. 260—761)

This invention relates to improved blended rubber compositions.

More specifically, the present invention contemplates compositions produced by blending raw rubber in its various forms such as crepe rubber, caoutchouc, latex, guayule, and all of the synthetic rubbers such as neoprene, Buna, Buna-S, Perbunan, and such products as Koroseal, Thiokol, and Vistanex polybutene with a high molecular weight viscous material naturally contained in a paraffin base oil and precipitated therefrom by a warm solution (above 77° F.) of a normally gaseous two-to-four carbon atom hydrocarbon solvent and, more particularly, blends of raw rubbers and synthetic rubbers with chemical condensation products of said precipitated high molecular weight viscous products separated from said warm hydrocarbon solvent solution.

The blending material contemplated by the present invention for use in production of blended rubber products preferably represents chemical condensation products derived directly from a paraffin base petroleum oil fraction which has undergone no thermal decomposition or chemical change other than that occasioned by ordinary distillation.

Such condensation products are free from asphaltenes and are derived from a paraffin base petroleum oil containing not substantially in excess of 0.2% asphaltic like constituents (Holde method).

In the preferred embodiment of the invention, the chemical condensation products for use in blending with raw and synthetic rubbers are chemically condensed from high molecular weight viscous materials that have been precipitated from a residual paraffin base oil through the medium of a warm propane solution. The chemical condensation is effected in the presence of air at temperatures from 400 to 575° F.

These condensation products are over 98% soluble in 88° Baumé petroleum naphtha. They have a lower iodine number than the naturally contained materials precipitated from the paraffin base oil fraction from which they are condensed.

The mechanism of the chemical condensation of the complex natural viscous materials precipitated from the paraffin base oils by warm hydrocarbon solutions is not fully understood but is believed to be induced by the presence of air due to oxygen being taken up by certain of the molecules, after which molecules are condensed with a splitting off of water to yield a higher molecular weight chemically condensed product. These products may, for convenience, be termed "polymers," but it is to be understood that such designation is not intended to signify that they have resulted wholly from the union of like molecular structures.

The specific nature of the condensation products will, of course, vary and be dependent upon the source materials, i. e., the natural viscous precipitates separated from the paraffin base oils by treatment with hydrocarbon solvents, and the conditions under which these materials have been obtained. The precipitates are to be distinguished from the waxes separated by chilling a warm hydrocarbon solution of a wax-bearing paraffin base fraction, although it will be appreciated that in a normal hydrocarbon solvent dewaxing operation some other high molecular weight naturally contained viscous materials are separated out with the wax and may be recovered by further treatment of the wax with a warm hydrocarbon solvent and precipitating such viscous materials therefrom. The highly viscous materials thus derived from the wax are within the contemplation of source materials for the production of condensation products of the present invention.

As illustrative of the manner of deriving the source materials from which the condensation products of the present invention are produced, it is desirable to briefly review the treatment that results in the production of such source materials. While reference will be made more particularly to the use of propane in obtaining the source materials of the present invention, it is to be understood that other hydrocarbon precipitants, for example, the low molecular weight normally gaseous hydrocarbons of from two to four carbon atoms, may likewise be used, and that propane is referred to as the preferred embodiment of the invention.

A so-called "cylinder stock" is charged to propane dewaxing and precipitating operations, although any residual stock from normal or vacuum distillation of a paraffin base crude may be so charged. The specific character of the charge will depend somewhat on the viscosity and pour point of the ultimately desired oil product of the propane treatment. For example, if it is the purpose of the propane treatment to obtain a so-called "bright stock" having a S. S. U. viscosity of 150 at 210° F., the cylinder stock charging material will have approximately the following specifications:

| | |
|---|---|
| Viscosity _____S. S. U. at 210° F__ | 175 |
| Optical density (color) _____ | 2800 |
| A. P. I. gravity _____ | 25.6 |
| Conradson carbon residue _____per cent__ | 2.6 |
| Flash (Cleveland open cup) _____°F__ | 565 |

Where a bright stock having a viscosity at 210° F. of 120 S. S. U. and a zero pour point is the desired oil product of the propane treatment, the cylinder stock charge will have approximately the following specifications:

| | |
|---|---|
| Viscosity _____S. S. U. at 210° F__ | 165 |
| Optical density (color) _____ | 2700 |
| A. P. I. gravity _____ | 25.8 |
| Conradson carbon residue _____per cent__ | 2.25 |
| Flash (Cleveland open cup) _____°F__ | 560 |

Such a cylinder stock charging material is subjected to propane treatment in the following manner:

The charging stock is mixed with propane and fed into a warm solution tank at a temperature of approximately 65° F. The cylinder stock propane solution is then transferred into a chiller and the pressure reduced until a temperature of the order of —20 to —54° F. is obtained, depending upon the desired pour point of the ultimate oil product.

When the cylinder stock-propane solution has been sufficiently chilled, it is transferred to a filter feed tank and thence to an appropriate filter to secure separation of the wax from the chilled solution. The chilling is effected by evaporation of propane in the well recognized manner and make-up propane is added during the chilling operation so that a ratio of propane to oil of approximately three to one prevails at the end of the chilling cycle and at the time of filtration. The propane oil solution which has been freed from undissolved wax in the filter is then given a further treatment in which propane is added until the propane oil ratio is raised to approximately eight to one and the temperature of this solution is elevated to a temperature above 77° F. and preferably to a temperature of approximately the order of 155° to 165° F., but below the critical temperature of the solvent which results in the precipitation of high molecular weight naturally contained viscous materials.

While in the above exemplification the solvent dewaxing is described as occurring in advance of the precipitation from the warm hydrocarbon solution, it is desired to point out that the precipitation step may be effected in advance of dewaxing without materially modifying the character of the precipitate.

In fact in some instances the initial precipitation from the warm solvent solution may be preferred particularly where wax separation is effected by centrifuging. While we have referred to dewaxing in propane solution, it is to be understood that any type of solvent dewaxing process for the removal of precipitated wax may be used prior to the precipitation of viscous hydrocarbon materials from the warm propane solution in producing the source materials contemplated herein.

The precipitated material, separated from the warm propane solution either before or after dewaxing of the cylinder stock, may advantageously be subjected to further treatment to separate the same into relatively higher and lower viscosity materials and to separate such incidental bright stock as may have been carried down with the viscous precipitates.

Specifically when employing a warm propane solution of the paraffin base oil product having a temperature of the order of 160° F., the precipitate may be further separated into a series of different viscosity products by first adding propane and lowering the temperature to about 80° F., whereupon the higher viscosity materials separate, i. e., those having a viscosity at 210° F. from 3000 to 5000 S. S. U., and thereafter progressively raising the temperature to approximately 160° F. with successive separation of materials ranging in viscosity from approximately 2000 S. S. U. at 210° F. down to approximately 400 S. S. U. at 210° F.

These thus produced naturally contained high molecular weight hydrocarbon materials that have been precipitated from a paraffin base oil constitute the source materials for producing the condensation products of the present invention. It is, of course, to be understood that the like materials precipitated by two to four carbon atom hydrocarbon solvents other than propane are also comprehended herein.

In accordance with the present invention, the source materials derived in the manner above indicated are chemically condensed (which term is intended to embrace polymerization) in the presence of air while maintained at a controlled temperature below that at which thermal decomposition or flashing occur. The air blowing of these source materials results in an exothermic reaction, thus rendering the process at least partially self-sustaining without application of further extraneous heat, although it may be necessary to add extraneous heat, depending upon the source material being treated and the design of the particular vessel in which the air blowing operation is carried on. The rate of air blowing is so controlled as to maintain the temperature at approximately 475 to 575° F.

For purposes of illustration and not by way of limitation, the following illustrative examples are given:

EXAMPLE 1

In this example, a natural high molecular weight viscous precipitate was derived from a paraffin base cylinder stock in the manner hereinabove outlined, and represents the heavier molecular weight portion separated from the overall warm propane solution precipitates at a temperature of approximately 80° F.

These natural occurring precipitated materials have the following properties:

| | |
|---|---|
| Visc. S. S. U. at 210° F_____ | 5250 |
| Penetration 100 g. total wt. (A. S. T. M. D4–25) cm. $\times 10^{-2}$__ | Too soft to give a reading |
| Ball & Ring softening point (A. S. T. M. D36–26) °F_____ | Below 80° F. |
| Molecular wt. (avg.)_____ | 1380 |
| Iodine No. Wijs method_____ | 57 |
| Carbon atoms per double bond (avg.)_____ | 32 |

Starting with this source material, the same was charged to a suitable apparatus for air blowing and initially heated to a temperature of approximately 500° F. accompanied by the introduction of air.

Care was exercised to avoid elevation of the temperature to a degree that would cause flashing. The air blowing in the instant example was conducted for approximately two hours with the temperature maintained within the range of from 480 to 500° F. This operation resulted in the production of a condensation product having the following characteristics:

Visc. S. S. U. at 210° F.
 Too viscous for ready determination
Penetration 100 g. total wt. (A. S. T. M. D5–25) cm.×$10^{-2}$ _____ 101
Ball & ring softening point (A. S. T. M. D36–26) °F _____ 115
Molecular weight (average) _____ 1900
Iodine No. Wijs method _____ 41
Carbon atoms per double bond (avg.) ____ 44

It is to be noted that this product possessed a lower iodine number and a much higher molecular weight than did the source materials which were subjected to condensation in the presence of air.

EXAMPLE 2

In this example the same viscous source material was used as in Example 1. The air blowing was conducted under conditions similar to those in Example 1, except that the air blowing was continued for a period of approximately nine hours. The resulting condensation product was found to possess the following characteristics:

Visc. S. S. U. at 210° F.
 Too viscous for ready determination
Penetration 100 g. total wt. (A. S. T. M. D5–25) cm.×$10^{-2}$ _____ 23
Ball & ring softening point (A. S. T. M. D36–26) °F _____ degrees__ 218
Molecular weight (average) _____
Iodine No. Wijs method _____ 39
Carbon atoms per double bond (avg.) ____ 46

EXAMPLE 3

The source material for this example differed somewhat from the source materials of Examples 1 and 2 in that it constituted a less viscous portion of the material which had been separated from the overall warm propane precipitate at a temperature of approximately 150° F. This somewhat less viscous source material had the following characteristics:

Visc. S. S. U. at 210° F _____ 746
Penetration 100 g. total wt. (A. S. T. M. D5–25) cm.×$10^{-2}$__ Too soft to give a reading
Ball & ring softening point (A. S. T. M. D36–26) °F _____ Below 80° F.
Molecular weight (average) _____ 1090
Iodine No. Wijs method _____ 43
Carbon atoms per double bond (avg.) ____ 42

This viscous oil precipitate was subjected to air blowing in a manner comparable to that set forth in Example 1, with the exception that during the latter stages of the air blowing the temperature was allowed to rise to approximately 520° F. and the air blowing was continued for approximately 15 hours. The resulting condensation product thus produced possessed the characteristics shown in the following table:

Visc. S. S. U. at 210° F.
 Too viscous for ready determination
Penetration 100 g. total wt. (A. S. T. M. D5–25) cm.×$10^{-2}$ _____ 75
Ball & ring softening point (A. S. T. M. D36–26) °F _____ degrees__ 147
Molecular weight (average) _____ 1990
Iodine No. Wijs method _____ 33
Carbon atoms per double bond (avg.) ____ 55

EXAMPLE 4

The source material for this example constitutes a product separated from propane precipitated wax by further treatment with warm propane and precipitation therefrom of the high molecular weight viscous hydrocarbons at a temperature of approximately 165° F. This source material had characteristics as follows:

Visc. S. S. U. at 210° F _____ 543
Penetration 100 g. total wt. (A. S. T. M. D5–25) cm.×$10^{-2}$__ Too soft to give a reading
Ball & ring softening point (A. S. T. M. D36–26) °F _____ 106
Molecular wt. (average) _____ 1190
Iodine No. Wijs method _____ 35.9
Carbon atoms per double bond (avg.) ____ 51

This viscous source material derived from wax was air blown in a manner comparable to that set forth for Example 1 above, with the exception that in the latter stages of the air blowing, the temperature was allowed to rise to approximately 570° F. and the blowing was continued for a period of approximately 22 hours, at which time the resulting product had characteristics as follows:

Visc. S. S. U. at 210° F.
 Too viscous for ready determination
Penetration 100 g. total wt. (A. S. T. M. D5–25) cm.×$10^{-2}$ _____ 41
Ball & ring softening point (A. S. T. M. D36–26) °F _____ 315
Molecular wt. (average) _____ 2200
Iodine No. Wijs method _____ 35.2
Carbon atoms per double bond (avg.) ____ 52

It will be observed that the iodine number of each of the products is substantially lower than the iodine number of the source material from which the product was produced. The molecular weight of each of these products is materially greater than that of the source material. The condensation products are definitely harder than the source materials from which they are produced, as is clearly evidenced by the penetration data above indicated, and they likewise have a substantially higher softening point as shown by the ball and ring test data.

The condensation products of the present invention show a marked reduction in susceptibility to penetration with temperature change, in the range from 30 to 60° F. as shown in the following comparisons of the penetrations of the propane precipitated source material of Examples 1 and 2 above and that of the condensation product of Example 2 above:

*Penetration (A. S. T. M. D–5–25), cm.×$10^{-2}$*

| Temp., °F. | Source material of Examples 1 and 2 (100 g. total wt.) | Condensation product of Example 2 (200 g. total wt.) |
|---|---|---|
| 30 | 86 | 19 |
| 40 | 174 | 21 |
| 50 | 206 | 24 |
| 60 | 302 | 26 |
| 70 | | 32 |
| 80 | | 36 |
| 90 | | 42 |
| 100 | | 61 |

As has been mentioned, the condensation products herein above described are virtually completely soluble in petroleum naphtha. An indication of their solubility in various solvents is set forth in the following table:

the rubber component of the blend. The use of an anti-oxidant where synthetic rubbers are em-

| Solvent | Boiling point | Per cent solubility at room temperature | | | |
|---|---|---|---|---|---|
| | | Source material Examples 1 and 2 | Condensation product of Example 1 | Source material Example 3 | Condensation product of Example 3 |
| | *Degrees* | | | | |
| Benzene | 79–81 | 100+ | 100+ | 100+ | 100+ |
| Toluene | 109–110 | 100+ | 100+ | 100+ | 100+ |
| Xylene | 135–140 | 100+ | 100+ | 100+ | 100+ |
| M. S. (Varnolene) | 295–305 | 100+ | 100+ | 100+ | 100+ |
| M. S. (Solvesso #2) | 135–177 | 100+ | 100+ | 100+ | 100+ |
| Turpentine | 150 | 100+ | 100+ | 100+ | 100+ |
| Chloroform | | 100+ | 100+ | 100+ | 100+ |
| Carbon tetra chl | | 100+ | 100+ | 100+ | 100+ |
| Carbon disulfide | 46–47 | 100+ | 100+ | 100+ | 100+ |
| Ethyl ether | | 100+ | 100+ | 100+ | 100+ |
| i-Propyl ether | 67–69 | 100+ | 100+ | 100+ | 100+ |
| Amyl acetate | 110–150 | 100+ | 100+ | 100+ | 100+ |
| s-Butyl acetate | 104–130 | 24.6 | 15.2 | 100+ | 17.3 |
| Methyl ethyl ketone | 78–81 | 7.7 | 5.6 | 7.8 | 6.0 |
| Ethyl acetate | 77 | 4.3 | 3.7 | 5.1 | 4.2 |
| Butyl alcohol | 115–118 | 2.2 | 0.9 | 4.3 | 0.9 |
| Acetone | 56–57 | 1.8 | 1.3 | 1.7 | 1.3 |
| Furfural | | 1.6 | 0.8 | 1.5 | 1.0 |
| Ethyl alcohol | | 0.1 | 0.1 | 0.3 | 0.1 |

The various products derived from paraffin base oil fractions in the manner hereinbefore set forth and exemplified by the examples given have been found to be highly advantageous as blending agents for the production of natural and synthetic rubber blended products.

These blending agents contemplated by the present invention are especially well adapted for use in producing blended rubber products requiring a high degree of resistance to oxidation, since these blending agents are not adversely affected by oxygen. Because of this fact, blended rubber products in which these blending agents are used have long life and retain their original ductility and elasticity; i. e., "life," for prolonged periods.

The blending agents of the present invention are compatible in all proportions with raw rubber and with the various synthetic rubbers, making them particularly well adapted for blending with these materials.

The identity and composition of crepe rubber, both pale and brown, are well known, as are the characteristics of latex, and need no amplification here. Neoprene is a polymer of chloroprene; Buna is a straight butadiene polymer; Buna-S is a co-polymer of butadiene and styrene; Perbunan is a co-polymer of butadiene and acrylonitrile; Koroseal is a polymer of vinyl chloride; Thiokol is a condensation product of ethylene dihalides with sodium polysulfide; and Vistenex polybutene is a linear polymer of isobutylene.

Blends of any of the foregoing natural and synthetic rubbers with the paraffin base oil derivatives hereinbefore specifically described in any desired proportions are contemplated by the present invention.

The particular blending agent selected for compounding a given rubber blended product will depend on the character of the raw or natural rubber and the character of the synthetic rubber which is used in producing the blended rubber product, as well as upon the desired characteristics of the blended rubber product to be produced.

Where blends are made using small proportions of raw rubber, the resultant compound will be found sufficiently resistant to oxidation without the use of any anti-oxidants. Where large proportions of raw rubber are employed in compounding the blend, it may be desirable to incorporate a conventional rubber anti-oxidant in the rubber component of the blend. The use of an anti-oxidant where synthetic rubbers are employed will be dictated by the resistance of the particular synthetic rubber to oxidation, it being recognized that some synthetic rubbers are more resistant to oxidation than are the raw rubbers.

A very good blended rubber composition conforming to the present invention may be compounded from substantially equal parts of pale crepe rubber and a chemically condensed material having either the specifications set forth under Example 2 above or those of the condensed product given under Example 4. In compounding the blend, the pale crepe rubber may be milled on a roll mill having calendar rolls in the conventional way for a period of from fifteen minutes to one hour. After the preliminary milling of the crepe rubber, the chemically condensed blending agent may be added and the blend then milled for an additional period usually not exceeding twenty to thirty minutes. Other crepe and guayule crude rubbers may be blended in the same general manner. Variations in the time of milling may be resorted to, depending somewhat on the particular character of the raw rubber and also on the particular specifications of the blending agents selected for compounding the particular blended rubber product.

The compounding of blended rubber products with synthetic rubbers and the blending agents hereinbefore disclosed may be effected in the same manner as described for forming blended products with raw rubbers or they may advantageously be effected in mixing machines of the internal mixer type commonly used for effecting dispersing operations. These mixers are conventionally provided with steam jackets or similar arrangements for controlling the temperature of the materials being dispersed or admixed. A so-called "Mogul" kneading machine may also be used in producing blended rubber products in accordance with the practice of the present invention.

Where blended products are made with latex, the chemically condensed blending agent may be homogenized with latex or latex treated with sodium nitrite and thereafter removing the water.

The blended rubber compounds may likewise be produced by dissolving the rubber or synthetic rubber in a suitable solvent and adding thereto a selected blending agent from the paraffin base oil derivatives hereinbefore described and exemplified under Examples 1 to 4. Toluene is an exemplary solvent for use in the last described method of producing blended rubber products in accordance with the present invention, though other solvents may be used which are compatible with the constituents of the blend and susceptible to being removed from the ultimate product.

A particularly advantageous blended rubber product conforming to the present invention may be compounded from precipitated latex and the chemical condensation product, illustrative specifications for which are given under Example 4 above, by dissolving the precipitated latex in toluene and combining the same with the chemical condensation product in proportions of from 20 to 40 parts of latex to 60 to 80 parts chemical condensation blending agent of Example 4 and removing the toluene. This product possesses a high degree of elasticity and is both cohesive and adhesive, retaining these properties at exceedingly low sub-zero temperatures.

It has been found that the blended rubber composition of the invention may be rendered cellular or sponge-like by blowing the blending agent with steam. In fact, in effecting the chemical condensation in accordance with Example 4 above, if steam is introduced during the latter period of the air blowing, a highly cellular product is obtained which retains this characteristic even when blended with rubber.

The blended rubber products of the present invention are especially well adapted for use, where prolonged retention of the original properties of the composition are important, as for example in the fields of electrical insulation exterior surfacing, road joints and innumerable other applications.

Having thus described the invention, what is claimed as new is:

1. A blended rubber composition comprising, as an essential ingredient thereof, a chemically condensed naturally contained high molecular weight viscous material precipitated from a warm solution of a residual paraffin base oil product in a normally gaseous hydrocarbon solvent having from two to four carbon atoms per molecule, and which paraffin base product has undergone no thermal decomposition or chemical change beyond that induced by ordinary distillation, said condensation product being characterized in that it has a molecular weight above 1900, at least 40 carbon atoms per double bond, a ball and ring softening point above 200° F., and an iodine number below 50.

2. A blended rubber composition comprising a substantial portion of a rubber component and a chemically condensed hydrocarbon material derived from a paraffin base oil that has undergone no thermal decomposition or chemical change, said condensation product being characterized in that it has a molecular weight above 1900, at least 40 carbon atoms per double bond, a penetration below 50, a ball and ring softening point above 200° F., and an iodine number below 50.

3. A blended rubber composition comprising a substantial portion of a raw rubber and a chemically condensed hydrocarbon material derived from a paraffin base oil that has undergone no thermal decomposition or chemical change, said condensation product being characterized in that it has a molecular weight above 1900, at least 40 carbon atoms per double bond, a penetration below 50, a ball and ring softening point above 200° F., and an iodine number below 50.

4. A blended rubber composition comprising a substantial portion of a synthetic rubber selected from the class consisting of a polymer of chloroprene, a straight butadiene polymer, a co-polymer of butadiene and styrene, a co-polymer of butadiene and acrylonitrile, a polymer of vinyl chloride, a condensation product of ethylene dihalides with sodium polysulfide, and a linear polymer of isobutylene and a chemically condensed hydrocarbon material derived from a paraffin base oil that has undergone no thermal decomposition or chemical change, said condensation product being characterized in that it has a molecular weight above 1900, at least 40 carbon atoms per double bond, a penetration below 50, a ball and ring softening point above 200° F., and an iodine number below 50.

WILBERT B. McCLUER.
RALPH W. HUFFERD.